United States Patent
Dickman et al.

(10) Patent No.: US 7,764,676 B1
(45) Date of Patent: Jul. 27, 2010

(54) METHOD AND SYSTEM FOR PROCESSING NETWORK INFORMATION

(75) Inventors: Lloyd I. Dickman, Cupertino, CA (US); Ian G. Colloff, Los Gatos, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 408 days.

(21) Appl. No.: 11/461,387

(22) Filed: Jul. 31, 2006

(51) Int. Cl.
*H04L 12/56* (2006.01)

(52) U.S. Cl. .................. 370/389; 370/474; 709/212; 710/26

(58) Field of Classification Search ............ 370/392, 370/469, 474, 230, 389, 394, 395.1; 709/212, 709/250; 710/22, 26, 29
See application file for complete search history.

(56) References Cited

U.S. PATENT DOCUMENTS

| | | | | |
|---|---|---|---|---|
| 5,875,173 | A * | 2/1999 | Ohgane et al. ............ | 370/230 |
| 6,014,717 | A * | 1/2000 | Bezzant et al. ............ | 710/22 |
| 6,219,725 | B1 * | 4/2001 | Diehl et al. .............. | 710/26 |
| 6,708,233 | B1 * | 3/2004 | Fuller et al. ............. | 710/22 |
| 6,829,240 | B1 * | 12/2004 | Lincoln et al. ........... | 370/395.1 |
| 7,320,041 | B2 * | 1/2008 | Biran et al. .............. | 710/29 |
| 2001/0053148 | A1 * | 12/2001 | Bilic et al. .............. | 370/389 |
| 2002/0105971 | A1 * | 8/2002 | Tourunen et al. .......... | 370/469 |
| 2002/0122424 | A1 * | 9/2002 | Kawarai et al. ........... | 370/394 |
| 2004/0013117 | A1 * | 1/2004 | Hendel et al. ............ | 370/394 |
| 2004/0100900 | A1 * | 5/2004 | Lines et al. ............. | 370/229 |
| 2005/0141425 | A1 * | 6/2005 | Foulds ................... | 370/235 |
| 2006/0015651 | A1 * | 1/2006 | Freimuth et al. .......... | 709/250 |

* cited by examiner

*Primary Examiner*—Kwang B Yao
*Assistant Examiner*—Jeffrey M Rutkowski
(74) *Attorney, Agent, or Firm*—Klein, O'Neill & Singh, LLP

(57) ABSTRACT

Method and system for processing packets received from a network is provided. The system includes an adapter having a processing module that separates a header of a network packet from data, forwards the header to a host system and stores data associated with the network packet in a memory device of the network adapter. The host system processes the header and determines a destination for the network packet data. The method includes determining header boundary in a network packet, wherein an adapter coupled to a host system determines the header boundary; ending header information to the host system; and storing data associated with the network packet in a memory device of the adapter.

15 Claims, 3 Drawing Sheets

METHOD AND SYSTEM FOR PROCESSING NETWORK INFORMATION

BACKGROUND

1. Field of the Invention

The present invention relates to computing systems, and more particularly, to processing network information.

2. Background of the Invention

Conventional computing systems typically include several functional components. These components may include a central processing unit (CPU), main memory, input/output ("I/O") devices, and streaming storage devices (for example, tape drives). In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computing system is often referred to as a host system. The term computing system/host system as used throughout this specification, includes network servers.

Host systems (or servers) are used in various applications and environments, including networks and storage area networks ("SAN"). Servers typically communicate with each other using networks. SANs are commonly used to store and access data. SAN is a high-speed sub-network of shared storage devices, for example, disks and tape drives.

Host systems often communicate with other devices via network adapters (may also be referred to as "controllers"). The network adapters can be coupled to a host system via an interface (or by other means), for example, the "PCI" (or PCI-X/PCI-Express) bus interface, or the Hyper Transport interface. The standard bus specifications are incorporated herein by reference in their entirety. Different types of adapters are currently used by host systems, for example, host channel adapters (HCAs) and host bus adapters (HBAs).

Traditionally adapters have been either very simplistic in design or very complex. The simplistic design has been used where the adapter simply moves all the network information (i.e. header and data) to a host and performs very little analysis except in some cases, checking cyclic redundancy codes (CRCs).

In complex designs, adapters have been designed to offload most host processing. The complex design adapters often have one or more processor or complex state machines. The adapters can process network packets and need minimal host supervision. The goal for the complex adapter design is to save host processor cycles and power. However, host processors are becoming very powerful and with emergence of multi-core/multi-threaded processors, the need to save host processor cycles has diminished.

Therefore, what is needed is an optimum adapter design/process that can efficiently process network packets.

SUMMARY OF THE PRESENT INVENTION

In one aspect of the present invention, a network adapter for processing packets received from a network is provided. The adapter includes a processing module that separates a header of a network packet from data, forwards the header to a host system and stores data associated with the network packet in a memory device of the network adapter. The host system processes the header and determines a destination for the network packet data.

In another aspect of the present invention, a network system is provided. The network system comprising a host system with a central processing unit and an adapter for processing packets received from a network, wherein the adapter includes a processing module that separates a header of a network packet from data, forwards the header to the host system and stores data associated with the network packet in a memory device of the network adapter. The host system processes the header and determines a destination for the network packet data. The host system initializes a direct memory access module in the adapter to transfer data from the memory device to the destination.

In yet another aspect of the present invention, a method for processing network packets received from a network is provided. The method comprising, determining header boundary in a network packet, wherein an adapter coupled to a host system determines the header boundary; sending header information to the host system; and storing data associated with the network packet in a memory device of the adapter. The host system processes the header and determines a destination for the data stored in the memory device.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

System Overview

To facilitate an understanding of the preferred embodiment, the general architecture and operation of a network system will be described. The specific architecture and operation of the preferred embodiment will then be described with reference to the general architecture.

Figure 1:
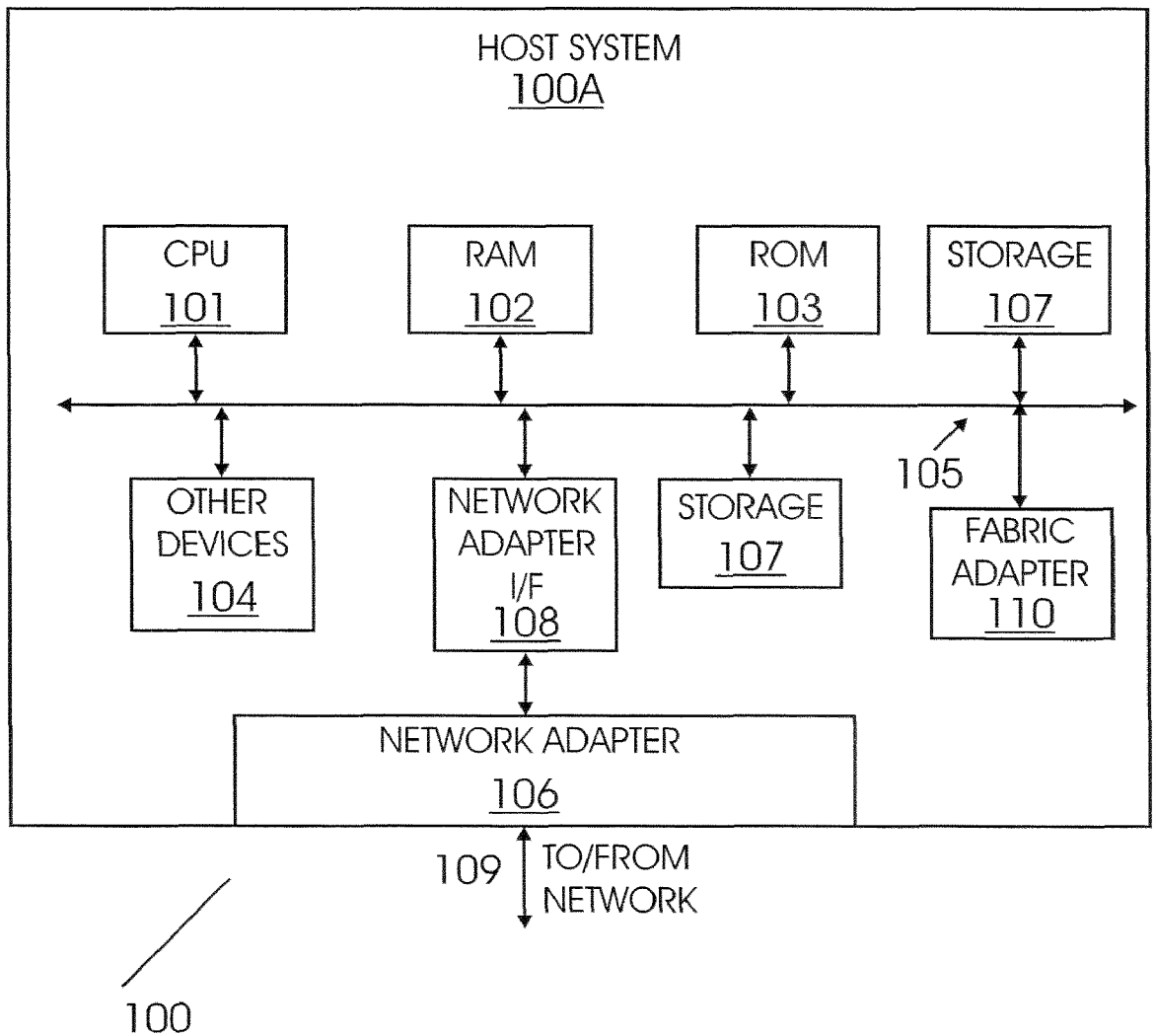
FIG. 1 shows a top-level block diagram of a system using an adapter, according to one aspect of the present invention.

FIG. 1 shows a block diagram of a networked system 100. System 100 includes a host computing system (may also be referred to as host system) 100A with a central processing unit 101 that executes program instructions out of memory 102 that may be random access memory (RAM). Read only memory 103 is also provided to store invariant instruction sequences such as start-up instruction sequences or basic input/output operating system (BIOS). Other devices (shown as 104) for example, a display device, mouse, and/or keyboard are also attached to an internal bus 105.

CPU 101 interfaces with a network adapter 106. Adapter 106 receives data/sends data to other networked devices (not shown) via link/connection 109. It is noteworthy that network adapter interface 108 is simply shown to illustrate a connection mechanism for network adapter 106. This may be achieved using different implementations, for example, an input/output bus (PCI-Express and others) or Hyper Transport Interface. These standard interface specifications are incorporated herein by reference in their entirety. The adaptive aspects of the present invention are not limited to any type of bus/inter-connect mechanism.

Storage 107, which may include a hard-drive, zip drive or any other storage media, to store programs, applications and data.

It is also noteworthy that the adaptive aspects of the present invention are not limited to the generic architecture of system 100, as shown in FIG. 1. For example, instead of system bus 105, different components may interconnect/interface with each other without system bus 105. The adaptive aspects of the present invention are not limited by the interface/inter-connect means of the various components shown in FIG. 1.

Fabric Adapter 110 is used to connect to other network fabrics, as might be the case if the host system provides gateway or router services.

Various standard protocols can be used facilitate host system 100A communication with networked devices. Fibre Channel, InfiniBand, Ethernet, iSCSI. IWARP, SRP, iSER, SDP, IPoIB, RDS are examples of such industry standards and are incorporated in their entirety by reference. It is noteworthy that the adaptive aspects of the present invention are not limited to any particular protocol or standard.

Network Adapter

Figure 2A:
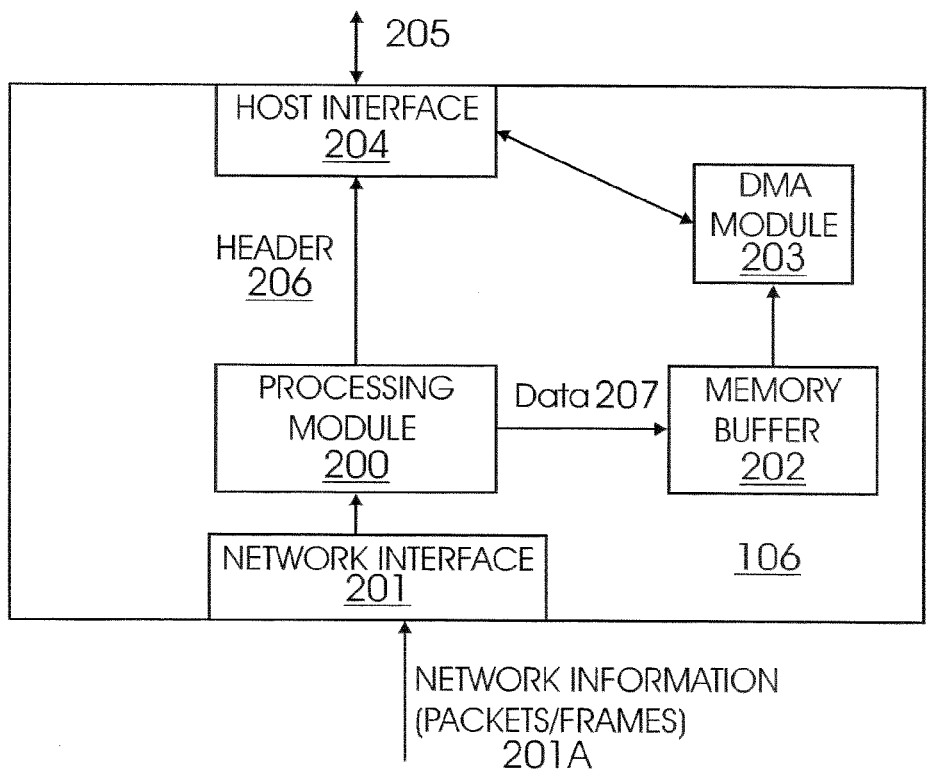
FIG. 2A shows a top-level block diagram of an adapter used according to one aspect of the present invention.

FIG. 2A shows a block diagram of adapter 106, according to one aspect of the present invention. Adapter 106 includes network interface 201 to receive information and send information (201A) from/to networked devices. Network interface 201 structure will depend on the overall network environment. For example, if host system 100A is operating in an Ethernet/Fibre Channel environment, then network interface 201 will include the logic to handle Fibre Channel frames/packets/information (used interchangeably throughout this specification). If host system 100A is operating in an Infini-Band environment, then network interface 201 includes logic to accept/send InfiniBand packets.

Figure 2B:
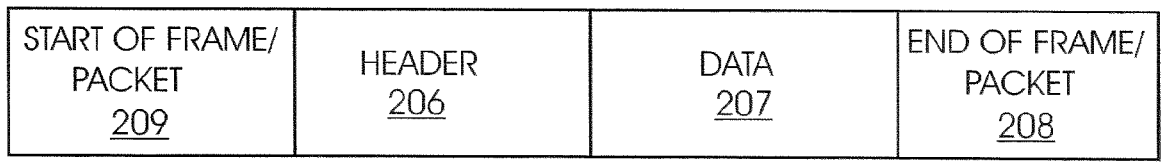
FIG. 2B shows a network packet/frame used according to one aspect of the present invention.

Network packet 201A is received from a networked device/system. FIG. 2B shows an example of a typical network packet 201A. A packet includes start of frame packet identifier 209, a header 206, data (or payload) 207 and an indicator, for example, end of frame/packet 208 that indicates the end of network packet 201A.

Turning back to FIG. 2A, adapter 106 includes a processing module 200 that receives network packets 201A. Processing module 200 receives the incoming packet 201A, and after performing initial verification separates header 206 from data 207. Header 206 and associated packet status information is sent to host system 100A via host interface 204 and bus/link 205. Data 207 is stored in memory buffer 202.

Data payloads (207) may be coalesced with the header (206) and delivered as single unit, or separately delivered to a designated data payload area in host memory. The data load size may be programmable.

If memory buffer 202 overflows, then data payloads may be directed to pre-designated locations in host memory to avoid dropping incoming packets.

Host interface 204 will depend on link 205. For example, if 205 is a PCI-Express bus, then host interface 204 includes logic to perform process steps to comply with PCI-Express specifications.

Host system 100A processes header 206 and determines where data 207 should be placed in host memory. Based on that, host 100A initializes a direct memory access ("DMA") module 203. DMA module 203 then moves data stored in memory buffer 202 to host memory (102).

Data may be moved directly to other fabric adapters 110 rather than to host memory. This permits efficient construction of gateway and router solutions.

DMA module 203 is used to perform transfers between memory locations, or between memory locations and an input/output port. After a DMA operation is completed, status information (indicators) are available for CPU 101. A DMA module functions asynchronously with respect to the host CPU 101 after initialization of control registers in the DMA module with transfer control information. The transfer control information generally includes source address (the address of the beginning of a block of data to be transferred), the destination address, and the size of the data block. The transfer control information may be in the form of a scatter-gather list that is used for moving data to physically non-contiguous memory locations.

The adaptive aspects of the present invention are not limited to any particular implementation or format for using the control information.

Figure 3:
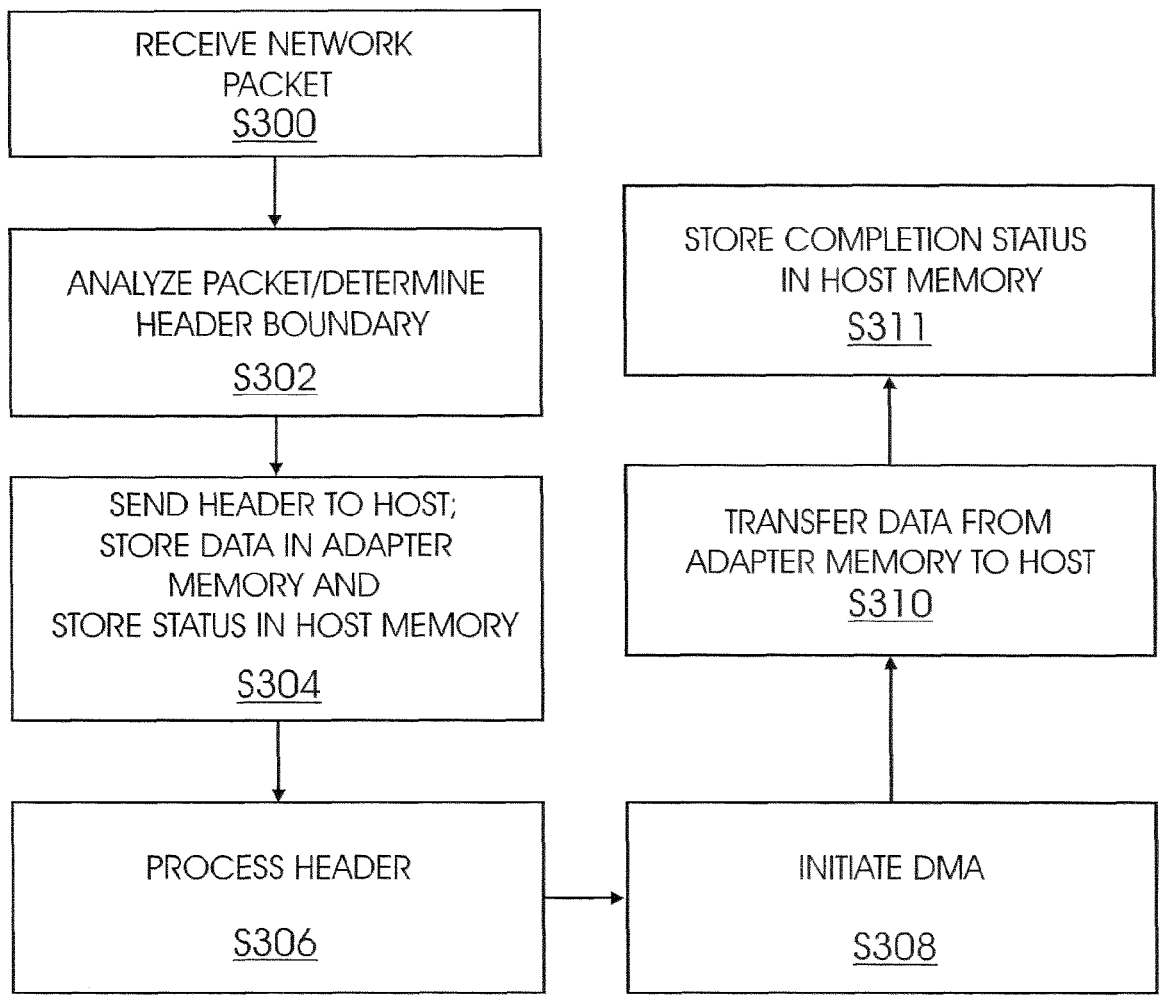
FIG. 3 shows a process flow diagram for processing network information that is received by a network adapter, according to one aspect of the present invention.

Process Flow:

FIG. 3 shows a process flow diagram for processing network packets as received by adapter 106, according to one aspect of the present invention. The process starts in step S300, when a network packet(s) is received.

In step S302, processing module 200 analyzes the network packet and determines the header boundary.

In step S304, header 206 is sent to host system 100A and data (207) is stored in memory buffer 202. Furthermore, status information regarding a packet may also be stored in step S304. Status information includes packet length, type of packet, address where the payload is located and whether the packet was valid or not.

In step S306, CPU 101 performs all upper layer protocols and determines the destination of the received network packet in host system memory 102.

In step S308, host system 100A (i.e. CPU 101) initializes DMA module 203 to move data (207) from memory buffer 202 to host memory 102 (or to any other location). In step S310, data is transferred from memory buffer 202 to host memory 102 or to any other location within host system 100A. Thereafter, status information is sent to host system 100.

In one aspect of the present invention, since data is moved only once from memory buffer 202 to host memory 102 (or to any other location), additional copying operations are not performed.

In another aspect, adapter 106 is designed optimally so that it can separate header processing from data payload. This is optimum use of CPU 101 capabilities without a significant performance penalty.

In yet another aspect of the present invention, network fabric adapters that are mostly "stateless" are provided. The stateless adapters may provide comparable performance to "state full" adapters. The term stateless, as used herein means that the host maintains network connection state information. The term "state full" means that an adapter maintains network connection state information.

Although the present invention has been described with reference to specific embodiments, these embodiments are illustrative only and not limiting. Many other applications and embodiments of the present invention will be apparent in light of this disclosure and the following claims.

What is claimed is:

1. A network adapter for processing packets received from a network, comprising:

a processing module that separates a header of a network packet from a payload of the network packet, forwards the header and associated packet status information, including packet length, type of packet, address where the packet is located and whether the packet was valid or not, to a host system, and stores the payload in a memory device of the network adapter;

wherein the host system processes the header; stores the status information; determines a destination for the payload, while the payload continues to be stored in the memory device; and initializes a direct memory access module in the adapter to transfer the payload from the memory device to the destination.

2. The network adapter of claim 1, wherein the destination is a host system memory.

3. The network adapter of claim 1, wherein the network is based on Fibre Channel.

4. The network adapter of claim 1, wherein the network is based on InfiniBand.

5. The network adapter of claim 1, wherein the network is based on Ethernet.

6. The network adapter of claim 1, wherein the network is based on iSCSI.

7. The network adapter of claim 1, wherein the network is based on any other protocol.

8. A network system, comprising:

a host system with a central processing unit and an adapter for processing packets received from a network;

wherein the adapter includes a processing module that separates a header of a network packet from a payload of the network packet, forwards the header and associated packet status information, including packet length, type of packet, address where the packet is located and whether the packet was valid or not, to the host system, and stores the payload in a memory device of the network adapter; and wherein the host system processes the header; stores the status information; determines a destination for the payload, while the payload continues to be stored in the memory device; and initializes a direct memory access module in the adapter to transfer the payload from the memory device to the destination.

9. The network system of claim 8, wherein the destination is a host system memory.

10. A method for processing network packets received from a network, comprising:

determining a header boundary in a network packet, wherein an adapter coupled to a host system determines the header boundary;

sending header information and associated packet status information, including packet length, type of packet, address where the packet is located and whether the packet was valid or not, to the host system; and storing a payload of the network packet in a memory device of the adapter;

wherein the host system processes the header; stores the status information; determines a destination for the payload, while the payload continues to be stored in the memory device; and initializes a direct memory access module in the adapter to transfer the payload from the memory device to the destination.

11. The method of claim 10, wherein the network is based on Fibre Channel.

12. The method of claim 10, wherein the network is based on InfiniBand.

13. The method of claim 10, wherein the network is based on Ethernet.

14. The method of claim 10, wherein the network is based on iSCSI.

15. The method of claim 10, wherein the network is based on any other protocol.

* * * * *

UNITED STATES PATENT AND TRADEMARK OFFICE
CERTIFICATE OF CORRECTION

| | | |
|---|---|---|
| PATENT NO. | : 7,764,676 B1 | Page 1 of 1 |
| APPLICATION NO. | : 11/461387 | |
| DATED | : July 27, 2010 | |
| INVENTOR(S) | : Lloyd I. Dickman et al. | |

It is certified that error appears in the above-identified patent and that said Letters Patent is hereby corrected as shown below:

In column 3, line 55, after "as" insert -- a --.

In column 4, line 33, delete "payload" and insert -- packet --, therefor.

Signed and Sealed this

Fifth Day of October, 2010

David J. Kappos
*Director of the United States Patent and Trademark Office*